United States Patent
Higuchi et al.

(10) Patent No.: US 6,967,987 B2
(45) Date of Patent: Nov. 22, 2005

(54) TRANSMISSION POWER CONTROL METHOD AND MOBILE COMMUNICATION SYSTEM

(75) Inventors: Kenichi Higuchi, Kanagawa (JP); Akihito Morimoto, Kanagawa (JP); Mamoru Sawahashi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 707 days.

(21) Appl. No.: 09/894,661

(22) Filed: Jun. 28, 2001

(65) Prior Publication Data

US 2002/0012383 A1    Jan. 31, 2002

(30) Foreign Application Priority Data

Jun. 29, 2000   (JP)   ............................. 2000-197375

(51) Int. Cl.[7] .............................................. H04B 1/69
(52) U.S. Cl. ...................... 375/130; 375/146; 375/147; 455/69; 455/522
(58) Field of Search ............................... 375/130, 147, 375/219, 295, 297, 316, 317, 345; 455/63.1, 455/69, 522

(56) References Cited

U.S. PATENT DOCUMENTS

| | | | |
|---|---|---|---|
| 6,163,705 A | 12/2000 | Miya ........................... | 455/522 |
| 6,628,924 B1 * | 9/2003 | Miyamoto .................... | 455/69 |
| 6,639,934 B1 * | 10/2003 | Engstrom et al. ............ | 375/130 |
| 6,771,978 B1 * | 8/2004 | Kayama et al. .............. | 455/522 |

FOREIGN PATENT DOCUMENTS

| | | | | |
|---|---|---|---|---|
| EP | 0 709 973 A1 | 5/1996 | .......... | H04B 7/005 |
| EP | 0 715 423 A1 | 6/1996 | .......... | H04B 7/005 |
| EP | 0 853 393 A1 | 7/1998 | ............ | H04B 7/26 |
| EP | 0986282 A1 | 4/1999 | ............ | H04Q 7/38 |
| EP | 0 963 059 A2 | 12/1999 | .......... | H04B 7/005 |
| EP | 1 128 578 A1 | 8/2001 | ............ | H04B 7/26 |
| JP | 08-116306 | 5/1996 | ............ | H04B 7/26 |
| JP | WO97/50197 | 12/1997 | ............ | H04B 7/26 |
| KR | 1998-018475 | 6/1998 | ............ | H04B 1/69 |
| WO | WO98/58461 | 12/1998 | .......... | H04B 7/005 |
| WO | WO99/55112 | 10/1999 | ............ | H04Q 7/38 |
| WO | WO00/27050 | 11/2000 | ............ | H04B 7/26 |

OTHER PUBLICATIONS

TIA/EIA/IS-95 "Mobile Station-Base Station Compatibility Standard for Dual-Mode Wide Band Spread Spectrum Cellular System", Telecommunication Industry Association, Jul. 1993.

F. Adachi, M. Sawahashi, and H. Suda, "Wideband DS-CDMA for Next Generation Mobile Communication System", IEEE Commun. Mag., vol. 36, pp. 56-69, Sep. 1998.

Austrian Patent Office Service and Information Sector (TRF) Singapore Application No.: 200103942-9.

Official Notice of Rejection Patent Application No. 2000-197375 Case No.: DCMH120056.

Official Notice of Rejection, Patent Application No.: 2000-197375, Case No.: DCMH120056.

* cited by examiner

*Primary Examiner*—Chieh M. Fan
(74) *Attorney, Agent, or Firm*—Workman Nydegger

(57) ABSTRACT

A reception error rate of a received signal is detected; the detected reception error rate is compared with predetermined target reception error rate; the SIR (the ratio between the target received signal power and the interference power), or the target reception power is corrected based on the result of the comparison; the control signal (TPC control bit) for transmission is set so that the transmission power can be controlled to a predetermined target value based on the SIR or the target reception power value.

4 Claims, 10 Drawing Sheets

MEASURED NUMBER OF FRAME = $N_{frame}$
MEASURED NUMBER OF FRAME ERROR = $N_{error}$ } → MEASURED FRAME ERROR RATE = $N_{error}/N_{frame}$

FIG.2A

MEASURED FRAME ERROR RATE = $N_{error}/N_{frame}$ (1) $N_{error} \geq T_{error}$ → TARGET SIR IS INCREASED BY $\Delta_{up}$ (dB)
(2) $N_{error} < T_{error}$ → TARGET SIR IS DECREASED BY $\Delta_{down}$ (dB)

FIG.2B

$N_{error}$ ← | → INCREASE BY $\Delta_{up}$
$T_{error}$ | DECREASE BY $\Delta_{down}$

TRANSMISSION POWER CONTROL METHOD AND MOBILE COMMUNICATION SYSTEM

This application claims priority under 35 U.S.C. 119 to Patent Application No. 2000-197375 filed Jun. 29, 2000 in Japan, the content of which is incorporated hereinto by reference.

BACKGROUND OF THE INVENTION

1. Field of the Invention

The present invention relates to a transmission power control method and a mobile communication system which can be applicable to a CDMA system (especially, a DS-CDMA transmission system) wherein the multiple-access can be performed by using spread spectrum in mobile communication.

2. Description of the Related Art

A conventional CDMA transmission system, such as a DS-CDMA transmission system, is a method in which secondary modulation for spreading a modulated information data signal by spread code at a high-speed rate is performed so that a plurality of communicators can communicate each other by using a common frequency band and each communicator is identified based on the spread code.

Therefore, in a receiver, it is necessary a received wideband input signal must be converted to a narrow-band signal through inverse spread process before performing conventional demodulation process. In the inverse spread process of the receiver, the correlation of a received signal with a spread code replica synchronized with the spread code phase of the received signal is detected. In the DS-CDMA transmission system, since all the communicators use a common frequency band, the capacity for the subscribers is dependent on "SIR" (the ratio between the received signal power for desired wave and the interference power necessary for obtaining the predetermined receive error rate).

The problem when the DS-CDMA transmission system is applied to mobile communication is so-called "perspective problem" characterized by that the level of a signal received by a base station vary largely according to each mobile station (i.e., a signal of the mobile station near to the base station is received at higher power), and that a received signal at a high level in the mobile station interferes with a received signals from other mobile stations, causing the deterioration of reception quality.

A solution as to the above perspective problem is that the transmission power control has been proposed. In general, in the transmission power control method, transmission power of each mobile station is controlled so that the received signal power from the each mobile station received by the base station or SIR (the ratio between the received signal power and the interference power) is given regardless of the position of each mobile station, thereby obtaining the equitable communication quality within a service area.

[Problems of Prior Art]

The mobile communication cellular services, which utilize the DS-CDMA that commercial service has been put and has been published in a few years, are as follows: IS-95 [TIA/EIA/IS-95 "Mobile Station-Base Station Compatibility Standard for Dual-Mode Wide band Spread Spectrum Cellular System", "Telecommunication Industry Association, July 1993.], W-CDMA [F. Adachi, M. Sawahashi, and H. Suda, "Wideband DS-CDMA for Next Generation Mobile Communication System" IEEE Commun. Mag., Vol. 36, pp. 56–69, Sept. 1998] and the like.

In these systems, in order to improve the performance of each system, channel coding (error correcting code), rake diversity reception method or the coherent demodulation method by using the pilot signal as well as the previous mentioned transmission power control can be used.

The performances of the channel coding, the rake diversity reception and the coherent demodulation by using the pilot signal vary depending on the number of multipath in the actual propagation path and the speed of the mobile station (phasing variation rate) or the like. For instance, in general, the effect of the channel coding increases relative to the increase of the speed of the mobile station. Further, on the contrary, in the case of the coherent demodulation using the pilot signal, the increase of the speed of the mobile station causes degradation in the accuracy of the amplitude and the phase of the received signal using the pilot signal, resulting in worsening of the reception error rate after demodulation.

Thus, in actual propagation path, even though the received signal power or the SIR is controlled to a fixed value by means of the transmission power control, the effect of channel coding, the effect of rake diversity effect, the accuracies of the estimation of amplitude and phase of the received signal using the pilot signal varies according to time variations such as the number of multipath and the velocity of the mobile station (phasing variation velocity), and so it becomes impossible to maintain a constant reception quality (reception bit error rate or reception frame error rate).

Further, in the case of the mobile communication cellular service using the DS-CDMA, one of the above literatures (IS-95, W-CDMA, etc.), the soft handover (site diversity) in which the hit-free high-quality reception can be realized is used.

In this case, for the up-link (a link comprising a mobile station as being a transmission side and a base station as being a reception side), the received signal in each base station is synthesized by radio network controller (RNC) as a station of higher hierarchy, thus improving reception quality. Therefore, when the target of the received signal power based on the transmission power control by each base station or the SIR is constant, the reception quality without side diversity becomes worse than that with the side diversity.

SUMMARY OF THE INVENTION

An object of the present invention, in the cellular communication using the CDMA transmission system (especially, the DS-CDMA), is to provide a transmission power control method and a mobile communication system in which transmission power control capable of realizing a constant reception quality (communication quality) can be performed regardless of the change in the propagation environment such as the change in the number of the multipath, the mobile station velocity or the like.

Another object of the present invention, in the cellular communication using the CDMA communication system (especially the DS-CDMA), is to provide a transmission power control method and a mobile communication system in which transmission power control capable of realizing a constant reception quality (communication quality) can be performed regardless of the change in the transmission and reception conditions such as the presence or absence of the site diversity reception.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The embodiments of the present invention will be described in detail referring to the drawings.

[The First Embodiment]

The first embodiment of the present invention will be described referring to FIGS. 1 to 5.

(Outline)

First, the outline of the present invention will be described below.

An outline of the present invention will be described below.

In the cellular communication using the CDMA communication system (especially the DS-CDMA), all the communicators use a common frequency band, and this make the received signal of each communicator interfere with one another. Thus, in order to increase the subscription capacity (or the number of the communicators allowed to communicate with one another simultaneously), it is important for each communicator to transmit respective signal by using a minimum transmission power necessary for obtaining a predetermined reception error rate.

If the target reception power or the target reception SIR (i.e., the ratio of the received signal power to the interference power) in transmission power, necessary for obtaining a predetermined reception error rate according to the propagation environment of each communicator (mobile station), can be varied, the transmission power of each mobile station can be controlled at a minimum so that subscriber capacity can be increased compared to the case where the target reception power or the target reception SIR is maintained constant.

Here, the system relating to the present invention will be explained.

The present invention relates to a mobile communication system to operate on the CDMA (Code Division Multiple Access) transmission system in which a multiple access transmission is performed by producing a spread signal with a wide band by means of a spread code of a higher transmission rate than the information transmission rate, e.g., a direct spread CDMA (hereinafter referred to as DS-CDMA).

Here, in the receiving apparatus, when the transmission power is controlled periodically so that the ratio of the received signal power to the interference power (SIR) in the received signal from the desired communicator (transmitter), a target reception SIR, or a target reception power value is given, the reception error rate (i.e., reception bit error rate, or reception frame error rate) of the received signal from the desired communicator is detected; the detected reception error rate is compared with the predetermined target reception error rate, and the target reception SIR value or the target reception power value for the transmission power control is corrected and is controlled based on the result of the comparison.

Further, in the transmission power control method, in correcting and controlling the target reception SIR value or the target reception SIR value for the transmission power control based on the result of the comparison of the target reception error rate and the detected reception error rate, the target SIR value or the amount of correction of the target reception power value can be variable.

The embodiments of the present invention will be described in the following.

(Composition of the Signal)

Figure 5:
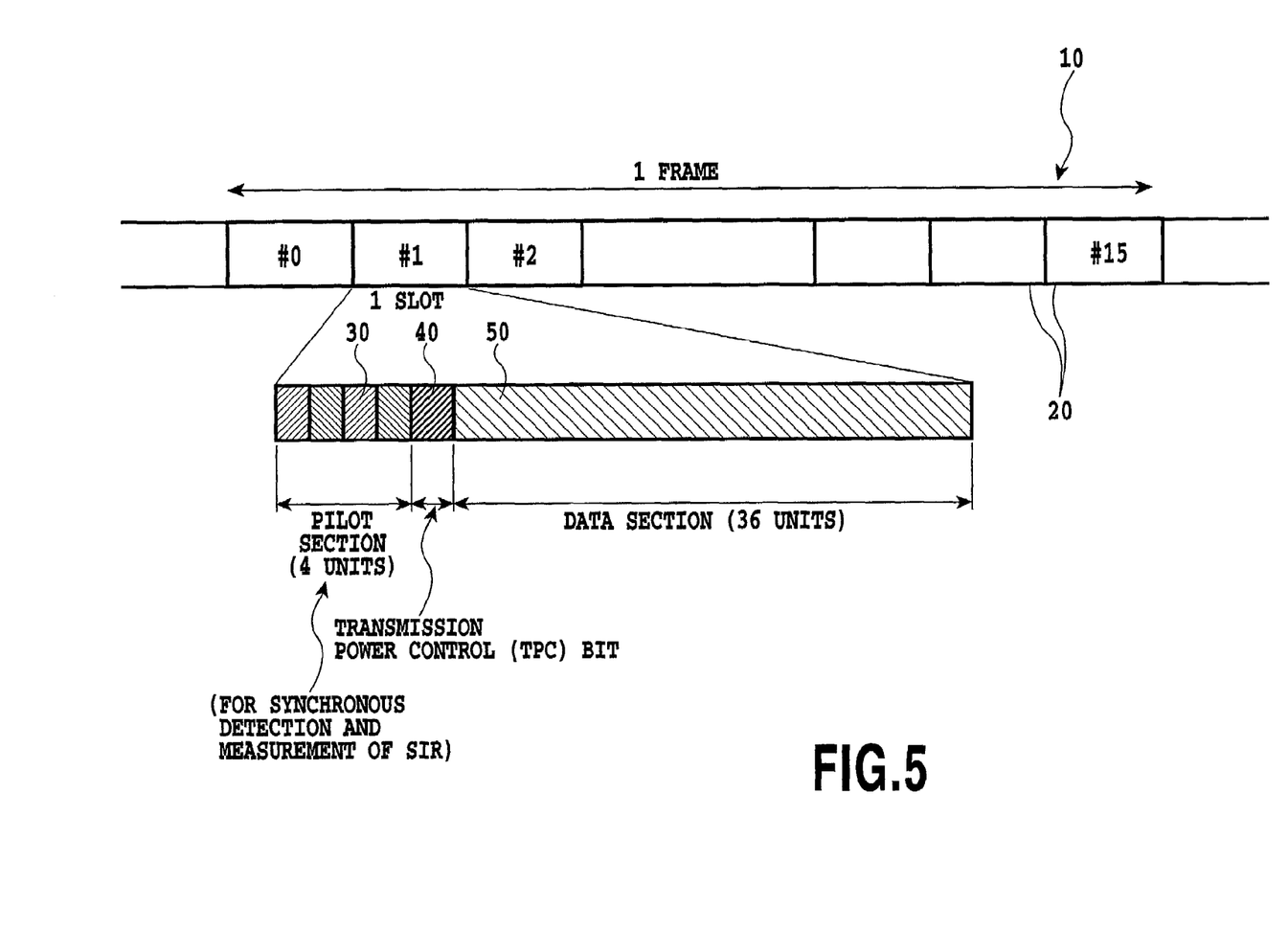
FIG. 5 is an explanatory diagram showing the composition of the signal frame.

FIG. 5 shows an example of the composition a signal frame used in the mobile radio communication system according to the present invention.

As shown in FIG. 5, 1 frame 10 of the signal includes 15 slots 20. Each slot 20 comprises pilot unit 30 including 4 pilot signals (signal whose modulation component is known) used for synchronous detection or the measurement of the SIR, a TPC control bit 40 for transmission power control (TPC) and a data unit 50 composed of 36 data signals, all of which are multiplied on time basis.

(Reception Error Rate: Frame Error Rate/Bit Error Rate)

Next, the reception error rate of the signal shown in FIG. 5 will be explained.

The reception error rate can be divided into the frame error rate and the bit error rate.

(Frame Error Rate)

The frame error rate can be expressed as

Frame Error Rate=(Number of Error Frame)/(Total Number of Frame)    (1)

For example, assuming that the number of the frame 10 to be received in a fixed period of time be 100, of which 5 are error frame, the frame error rate can be determined on the bases that the total number of frame=100, and the number of error frame=5.

Whether the frame is wrong or right can be determined, for example, by sending a signal coded according to generally known "Cyclic Redundancy Check (CRC)" to the data unit 50 composed of 16 slots 20 within the frame 10 and by decoding the CRC code at the receiver side to identify whether the result of the transmission is OK or NG.

If the result of decoding of the CRC code is NG, it is determined that at least one of the data signals of the data unit 50 of the 16 slots 20 within the frame 10 is wrong, and the frame 10 is counted as a wrong frame.

(Bit Error Rate)

The bit error rate can be expressed as

Bit Rate Error=(Number of Bit Error)/(Total Number of Bit)          (2)

For instance, assuming that the number of bits to be received in a fixed period of time is 100, of which 5 bits are wrong, the bit error rate=5 out of 100 bits.

Whether a given bit is wrong or not can be determined by going through the following steps. First, the received bit series is inputted to an error-correction decoder to obtain the corrected and decoded bit series. Then, the corrected and decoded bit series is inputted to an error-correction encoder, which is similar to one used for a transmitter, to obtain a coded bit series. The coded bit series obtained by going through the above steps must be identical with the originally received bit series, provided that all the errors have been corrected by error correction process.

Therefore, the bit error rate of the signal can be determined approximately by comparing the coded bit series after being decoded with the original received bit series to find the probability at which different bit occurs.

The term "approximately" used here is based on an assumption that the reception error becomes 0 by correcting the reception error. In practice, however, when the received bit error rate is defined as a level of $10^{-3}$ after being corrected, the received bit error rate remains at a level of about $10^{-1} \sim 10^{-2}$ before being corrected, and then the effect of the error included in the bit after being corrected can be disregarded.

(Transmission Control)

Figures 1, 1A:
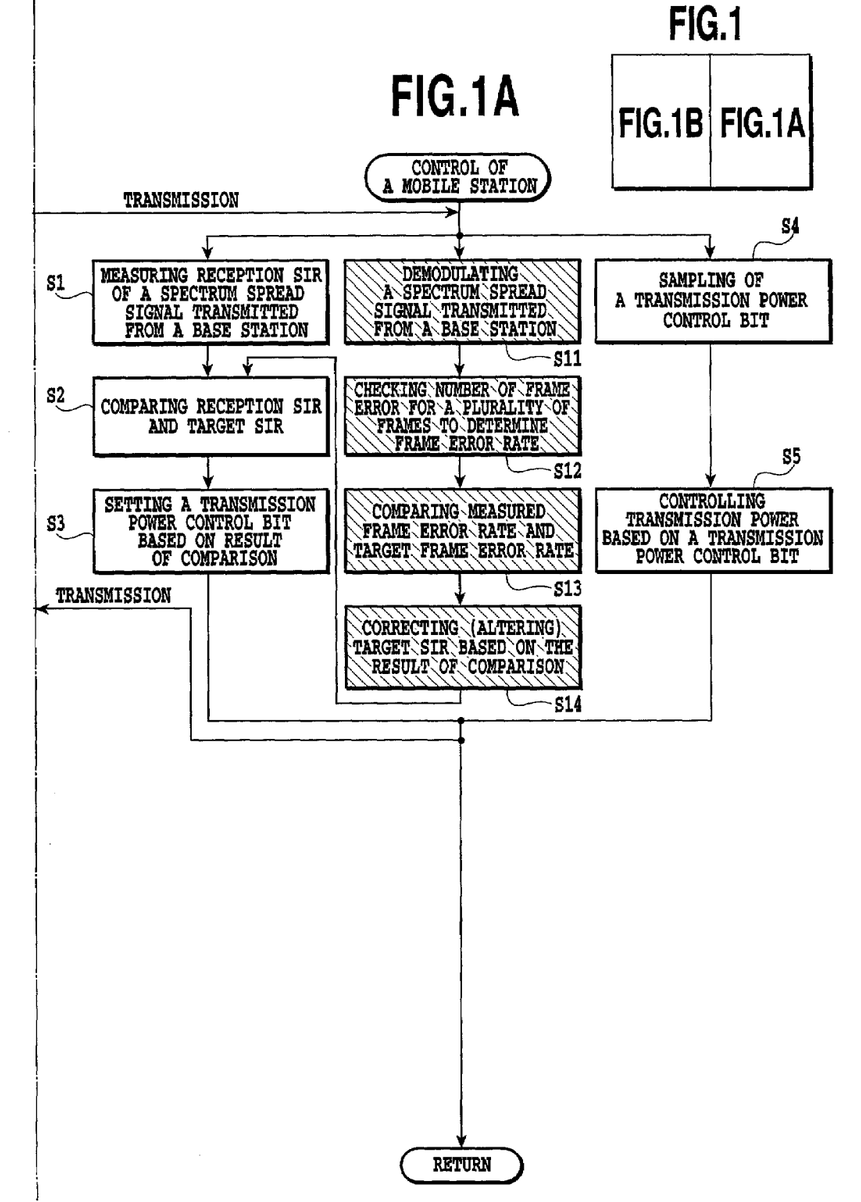
FIG. 1 is a flowchart showing the relationship of FIGS. 1A and 1B.
FIGS. 1A and 1B are block flowcharts showing an example of the data processing for the transmission power control as a first embodiment of the present invention.
Figure 1B:
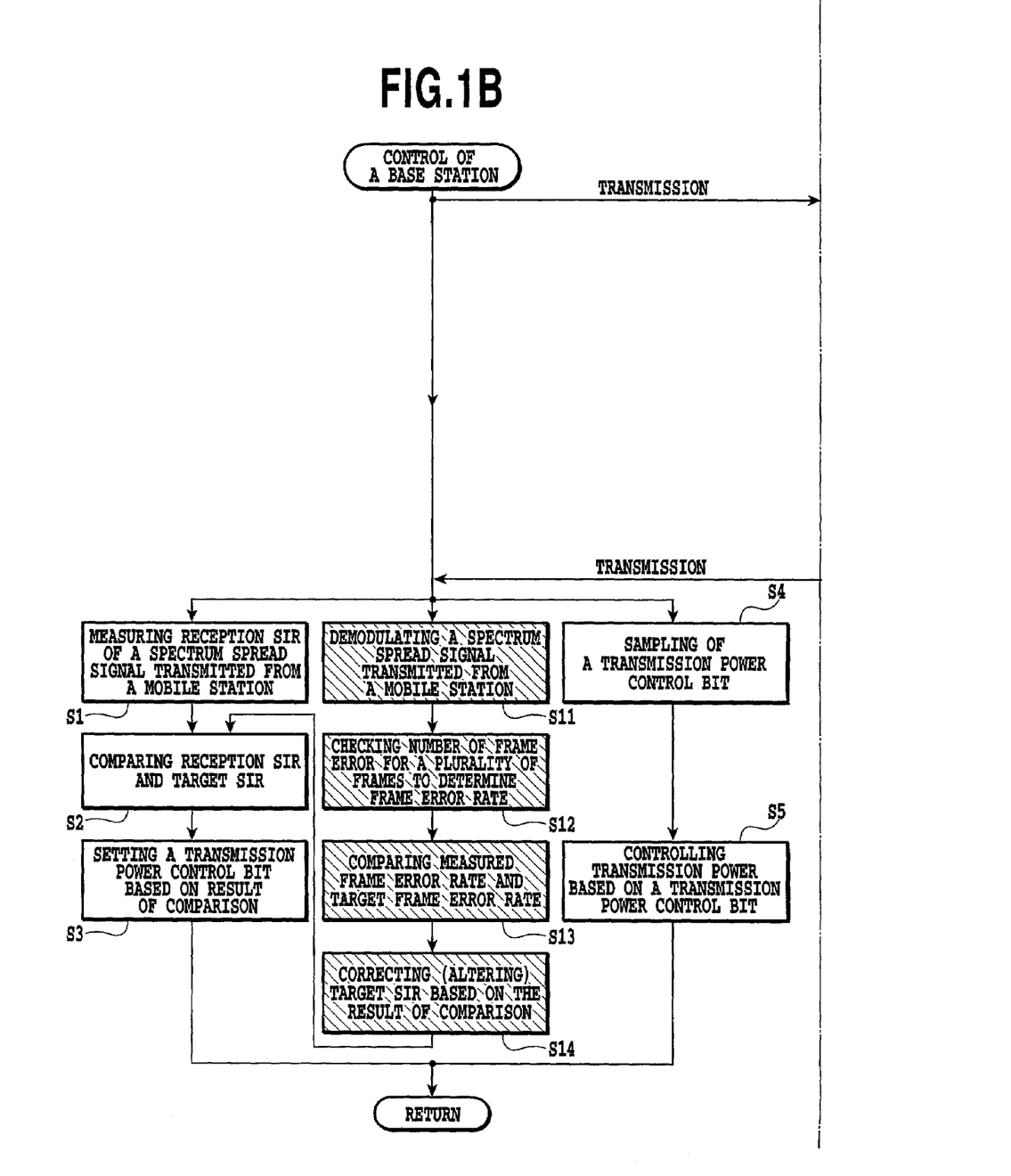

Next, FIGS. 1A and 1B are flowcharts showing the example of the data processing for the transmission power control system according to the present invention.

Since the process in the up-link (transmission side of the mobile station→reception side of base station) and the process in the down-link (transmission side of base station→reception side of mobile station) are basically identical with each other, the following explanation will be made referring to an example of the transmission power control of the up-link. Further, note that, in FIGS. 1A and 1B, the present embodiment is characterized by the steps S11 to S14.

In FIGS. 1A and 1B, first, in the base station, an instantaneous ratio of the received signal power to the interference power (SIR) is measured on the basis of the received spectrum spread signal from each mobile station (communicator) at step S1. In this case, the SIR measurement method can be performed by using a well know technique published in the literatures or the like.

Then, in step S2, the measured value of the instantaneous SIR is compared with the target SIR set for the mobile station.

Further, in step S3, the transmission power control (TPC) bit for controlling the transmission power of the mobile station is transmitted on the basis of the result of the comparison.

In the steps S4 and S5, in the mobile station, the transmission power is varied based on the received transmission power control bit.

In the case of a normal binary control, the control is performed as the following steps, where 1) measured SIR value>target SIR:
the base station transmits a command for "downing" transmission power→
the base station lowers the transmission power by 1 dB.
2) other conditions are given:
the base station transmits a command for "upping" transmission power→
the mobile station raises the transmission power by 1 dB.

By this control, the reception SIR at the base station will always take a SIR value close to the target SIR. In the case of the mobile communication cellular service by using the DS-CDMA transmission system, the period of the transmission power control is set to about 1000 times/second, thereby compensating the fluctuation of the reception level caused by phasing peculiar to the condition of the mobile communication environment as well as controlling the decline of the reception quality.

In step S11, in base station, the received spectrum spread signal (received signal) from each mobile station (communicator) is demodulated.

Then, in step S12, the frame error rate of the signal, which is demodulated as an index of the reception quality, is measured.

Here, an example for measuring the frame error rate will be described in the following.

In the mobile station, the transmitted signal is encoded by using the generally known cyclic redundancy check (CRC). In the base station, the coded signal by the CRC is decoded for each frame. If the result is OK, it is determined that the error of the frame is free. In the event of NG, it is determined that the error of the received frame is occurred.

In the base station, in the case of a certain number of frame, $N_{frame}$, of each mobile station, the number of frame, $N_{error}$, by which the result of the CRC becomes NG, is counted to measure the frame error rate. That is, the frame error rate=$N_{error}/N_{frame}$.

In step S13, in the base station, the measured frame error rate is compared with the predetermined target frame error rate is compared.

In step S14, the target SIR value by the conventional transmission power control set in each mobile station is corrected based on the result of the comparison. The correction of the target SIR value can be performed at intervals of 0.1 second-several seconds, since the correction is dependent upon the change in the propagation condition of each mobile station.

Example of Correction

Next, FIGS. 2A to 2C through 4A and 4B show an example for correcting the target SIR value in the transmission power control.

EXAMPLE 1

Figure 2A:
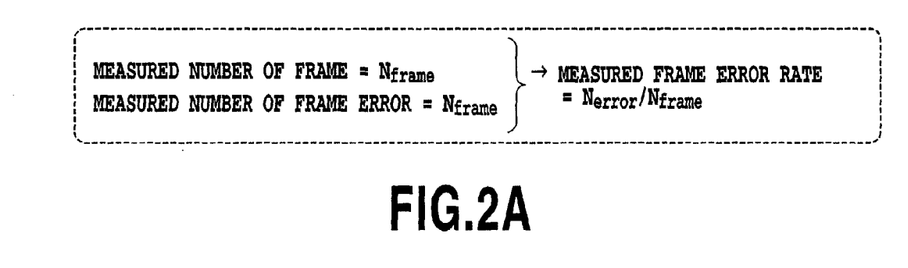
FIGS. 2A to 2C are explanatory diagrams showing an example for correcting the target SIR value (example 1), in the power transmission control.
Figure 2B:
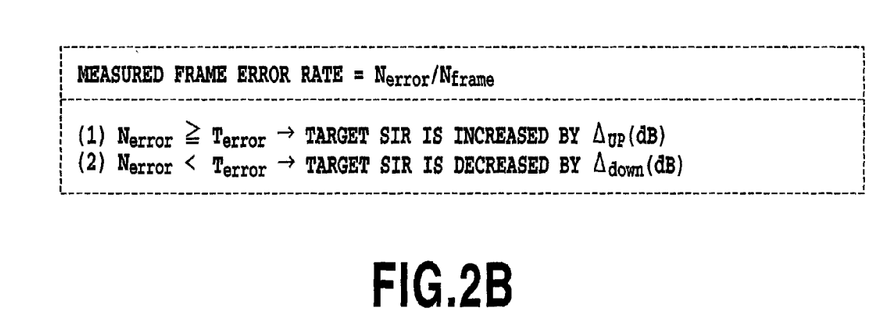
Figure 2C:
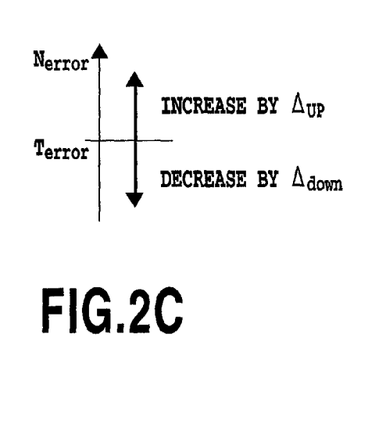

FIGS. 2A to 2C show the example 1.

In the example 1, the target SIR value is corrected based on the result of the comparison of the measured frame error rate=$N_{error}/N_{frame}$ with the target frame error rate=$T_{error}/N_{frame}$.

That is, where 1) the measured frame error rate≧target frame error rate, i.e., $N_{error} \geq T_{error}$, →the target SIR is increased by $\Delta_{up}$ dB.

2) the measured frame error rate<target frame error rate, i.e., $N_{error} < T_{error}$, →Target SIR is decreased by $\Delta_{down}$ dB.

That is, if the measured frame error rate is worse (greater) than the target frame error rate, the target SIR is increased. However, if the measured frame error rate is better (smaller) than the target frame error, the target SIR is decreased.

In general, the greater the target SIR, the greater the actual reception SIR becomes, thereby improving the reception quality. On the contrary, the smaller the target SIR, the smaller the actually received SIR becomes, resulting in the decline of the reception quality.

Thus, according to the present control method, the target SIR value can be controlled adaptively so that the target frame error rate is obtained. Further, since the control method is applied independently to each of the mobile stations (communicators), the control method adaptively varies depending on the number of multipath, mobile station velocity (phasing variation rate) and the like within the propagation path of each communicator.

(Embodiment 2)

Figure 3A:
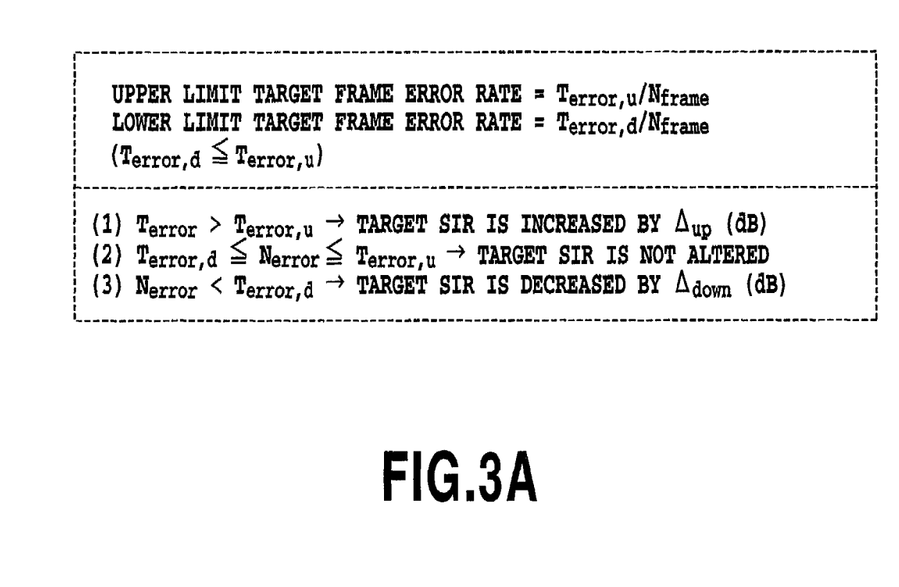
FIGS. 3A and 3B are explanatory diagrams showing an example for correcting the target SIR value (example 2) in the transmission power control.
Figure 3B:
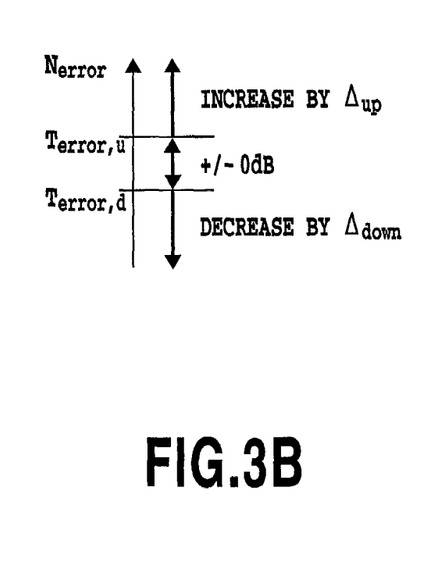

FIGS. 3A and 3B show the example 2.

In the example 2, two target frame error rates are provided. That is, upper limit target frame error rate=$T_{error.u}/N_{frame}$ and lower limit frame error rate =$T_{error.d}/N_{frame}$ are provided (Lower limit target frame error rate≦upper limit target frame error rate, that is, $T_{error.d} \leqq T_{error.u}$)

With this control method, where 1) the measured frame error rate>upper limit target frame error rate,
   that is, $N_{error} > T_{error.u}$:
   →Target SIR is increased by $\Delta_{up}$ (dB);
2) lower limit target frame error rate≦measured frame error rate≦upper limit target frame error rate,
   that is, $T_{error.d} \leqq N_{error} \leqq T_{error.u}$:
   →Target SIR is not altered;
3) the measured frame error rate<lower limit target frame error rate,
   that is, $N_{erro} < T_{error.d}$:
   →Target SIR is decreased by $\Delta_{down}$ (dB).

This example 2 differs from the example 1 in that the target SIR is not altered where the measured frame error rate is between the upper limit target frame error rate and the lower limit target frame error rate. In this way, it is possible that the stability of the control of the target SIR increases.

EXAMPLE 3

Figure 4A:
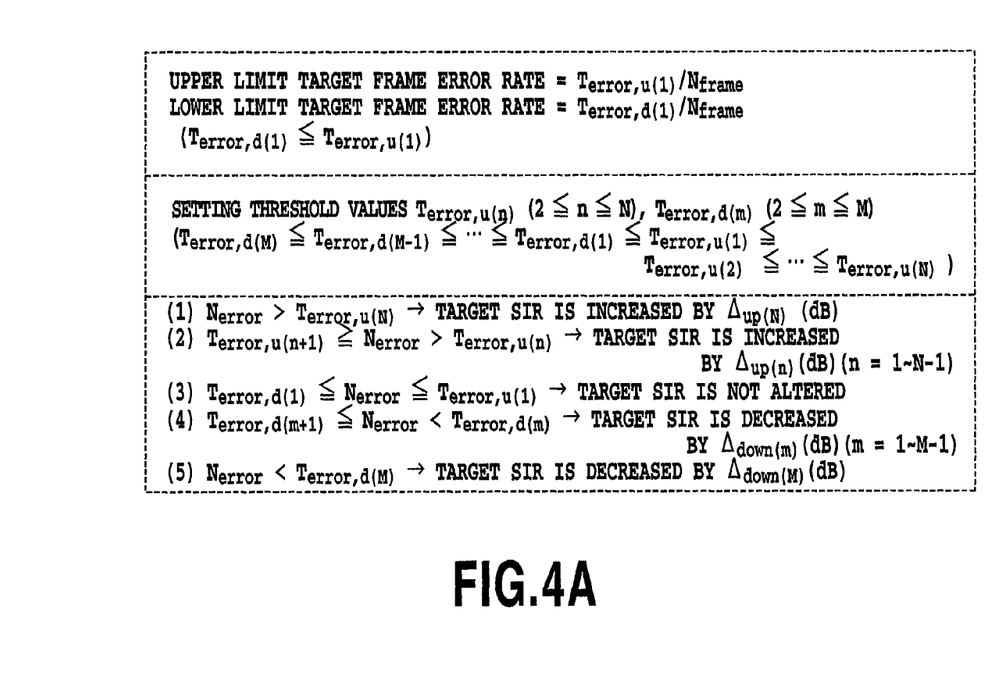
FIGS. 4A and 4B are explanatory diagrams showing an example for correcting the target SIR value (example 3) in the transmission power control.
Figure 4B:
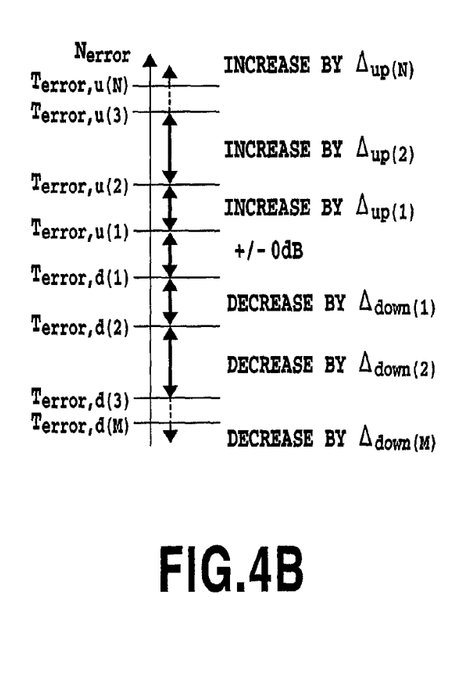

FIGS. 4A and 4B show the example 3.
In addition to
the upper limit frame error rate=$T_{error.u(1)}/N_{frame}$
and
the lower limit frame error rate=$T_{error.d(1)}/N_{frame}$,
   ($T_{error.d(1)} \leqq (T_{error.u(1)})$,
   threshold value=$T_{error.u(n)}$ (2≦n≦N),
   $T_{error.d(m)}$ (2≦m≦=M),
   ($T_{error.d(M)} \leqq T_{error.d(M-1)} \leqq \cdots \leqq T_{error.d\ (1)} \leqq T_{error.u(1)}$
   $\leqq T_{error.u(2)} \leqq \cdots \leqq T_{error.u(N)}$) are provided.

The target SIR is updated according to measured $N_{error}$ as given below.

1) $N_{error} > T_{error.u(N)}$ →Target SIR is increased by $\Delta_{up(N)}$ (dB);
2) $T_{error.u(n+1)} \geqq N_{error} > T_{error.u(n)}$ →Target SIR is increased by $\Delta_{up(n)}$(dB) (n=1~N-1);
3) where $T_{error.d(1)} \leqq N_{error} \leqq T_{error.u(1)}$, →target SIR is not altered;
4) where $T_{error.d(m+1)} \leqq N_{error} \leqq T_{error.d(m)}$, →target SIR is decreased by $\Delta_{down(m)}$ (dB) (m=1 to M-1);
5) $N_{error} < T_{error.d(M)}$, →target SIR is decreased by $\Delta_{down(M)}$ (dB).

According to this control method as in the case of example 2, the target SIR is adaptively corrected so that the frame error rate becomes a value between the upper limit target frame error rate and the lower limit target frame error rate or an equivalent value thereto.

Further, for example, when operating condition is set to $\Delta_{up\ (n)} < \Delta_{up\ (n+1)}$, $\Delta_{down\ (m)} < \Delta_{down\ (m+1)}$, if propagation environment is changed rapidly and the frame error rate has declined sharply (rapid increase of $N_{error}$), such change can be controlled quickly by raising the increase rate of the target SIR, thereby suppressing shortly the degradation time of reception quality.

On the contrary, when the frame error rate rises sharply due to the change in propagation environment, thereby decreasing the target SIR quickly and minimizing, the transmission power of each mobile station.

On the other hand, when the difference between $N_{error}$ and $T_{error.u(1)}$ or T error.d(1) is small, the amount of correction of the target SIR can be smaller, thereby obtaining a stable reception quality.

[Second Embodiment]

Next, the second embodiment of the present invention will be explained referring to FIGS. 6 to 9A and 9B.

(Outline)

First, the outline of the present system will be explained.

This system relates to a site diversity reception that the transmitted signal from a communicator is received by a plurality (=M) of stations and is further synthesized by a station of higher hierarchy. In a receiving station #m (1≦m≦M), the transmission power is periodically controlled on the side of the transmitter so that SIR of the received signal(the ratio (#m) between the signal power and the interference power), or a target reception SIR value #m or a target reception power #m having the reception power #m. In each receiving station #m, the reception error rate #m such as the reception bit error rate #m or the reception frame error rate #m in each communicator (transmitter) is detected.

Based on the result of the comparison between the detected reception error rate #m and the target reception error rate #m which is set previously by each receiving station #m, the target reception SIR value #m or the target reception power #m for the transmission power control at a receiving station is controlled for correction.

Furthermore, in the station of a higher hierarchy, the above-mentioned correction control system for detecting the synthesized received error rate such as the synthesized reception bit error rate or the synthesized reception frame error rate is detected. The received signal from the communicator at each receiving station is synthesized by site diversity. Based on the result of the comparison between the detected synthesized signal reception error rate and the predetermined target synthesized reception error rate,the target reception error rate #m at each receiving station is controlled for correction.

Further, when the correction control of the target reception error rate #m is performed, based on the result of the comparison, the amount of the correction of the target reception error rate #m at each receiving station is able to variable according to the magnitude of the difference between the target synthesized reception error rate and the measured synthesized reception error rate.

(The correction control method) will be explained specifically in the following.

(Transmission Control)

Figure 6:
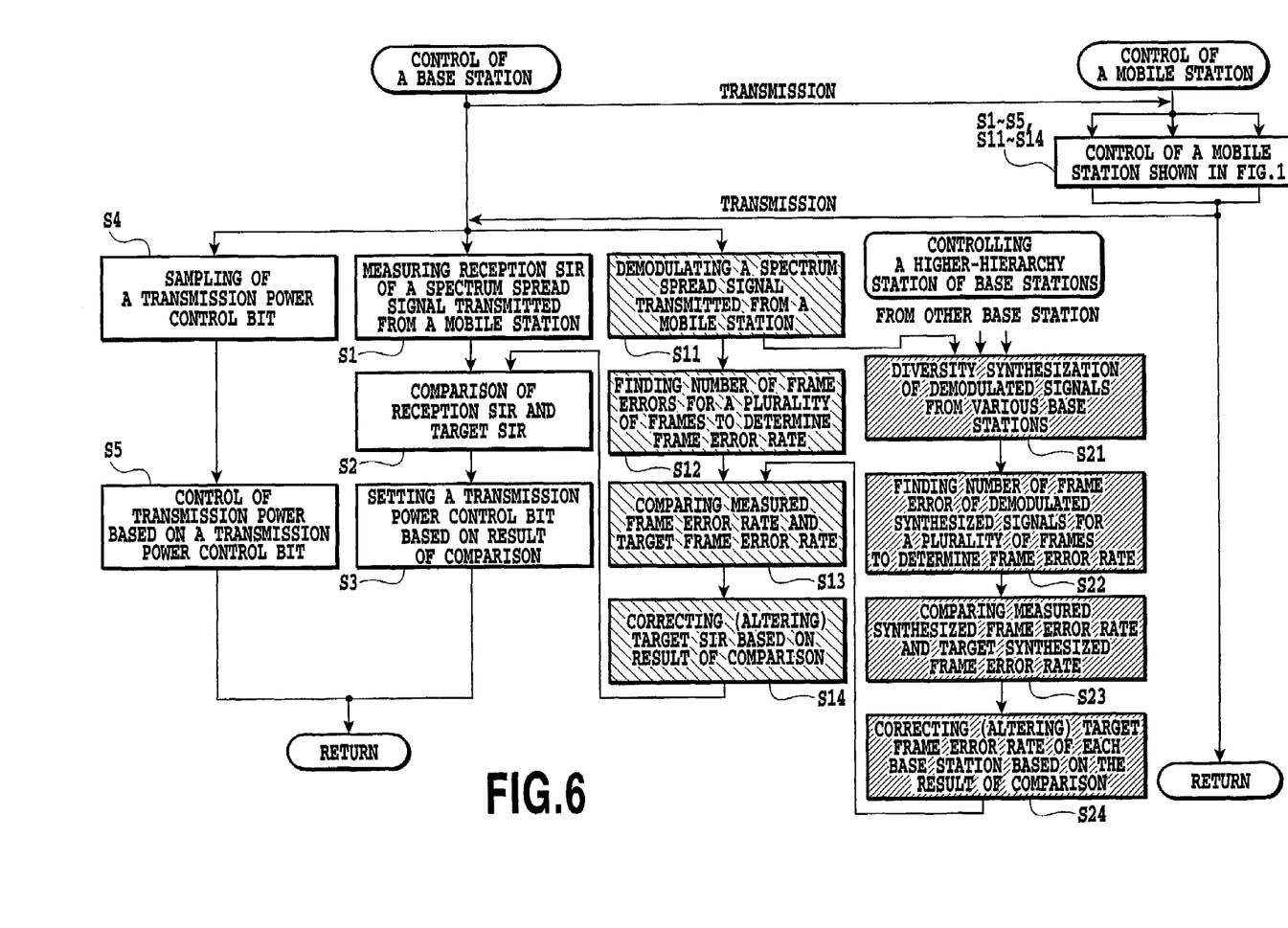
FIG. 6 is a flowchart showing an example of the data processing for the transmission power control as the second embodiment of the present invention.

FIG. 6 is a flowchart showing the data processing for the transmission power control in this system.

An example of the transmission power control of the up-link (transmission side of mobile station→reception side of base station) will be explained below.

In FIG. 6, in control on the side of the base station, steps S21 to S24 show the data processing for the transmission power control. Further, steps S1 to S5 show well known transmission power control process, while the steps S11 to S14 show the transmission power control process mentioned in the case of the example 1, and the explanation thereof will be omitted here.

In FIG. 6, in the step 21, each signal from the mobile station received by a plurality of base stations is demodulated in each base station and then is performed for processing diversity synthesis at a higher hierarchy station among base stations. Generally known techniques, such as the selective synthesis and maximum ratio synthesis are used as the diversity synthesis methods.

In step S22, in a higher hierarchy among base stations, the frame error rate of the demodulated signal from the diversity-synthesized signal is measured. The measurement method of the frame error rate is the same as the explanation of FIGS. 1A and 1B relating to the first embodiment may be used.

Next, in step S23, the measured synthesized frame error rate and the predetermined target synthesized frame error rate are compared.

Then, in step S24, the target frame error rate set for each mobile station is corrected based on the result of the comparison in each base station.

More particularly, when the synthesized frame error rate is smaller than the target synthesized frame error rate, this means that the reception quality of the mobile station concerned (communicator) is excessive, and then the target frame error rate of each base station is increased. Therefore, the (previous) target SIR based on the transmission power control in the mobile station is controlled to a smaller value, thus making the reduction of the transmission power of the mobile station much smaller.

CORRECTION EXAMPLE

Next, FIGS. 7A to 7C to 9A and 9B show the examples for correcting the target frame error rate of base station in the transmission power control.

Example 1

Figure 7A:
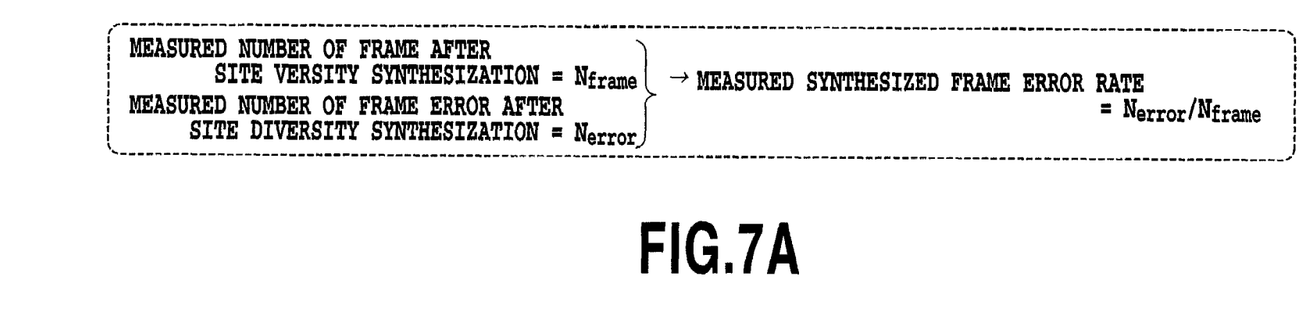
FIGS. 7A to 7C are explanatory diagrams showing an example for correcting the target frame error rate of the base station (example 1) in the power transmission control.
Figure 7B:
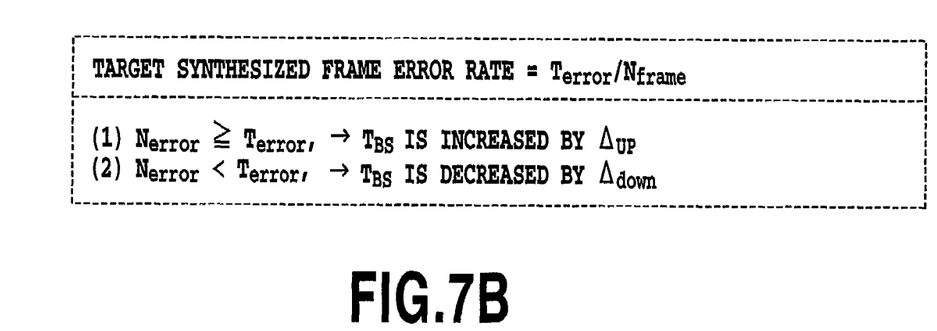
Figure 7C:
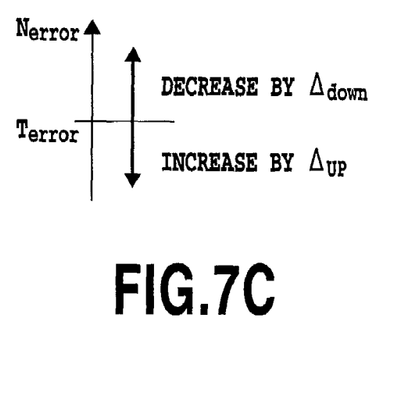
Figure 8A:
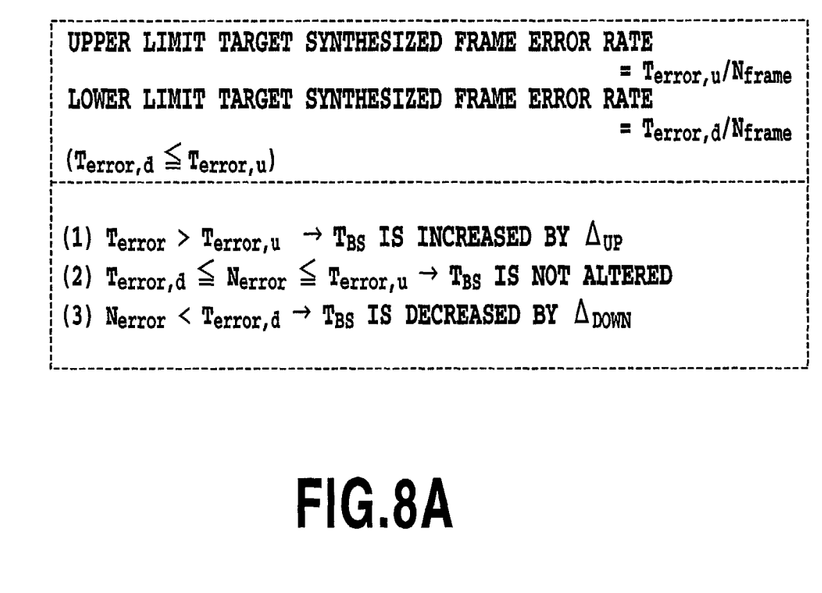
FIGS. 8A and 8B are explanatory diagrams showing an example for correcting the target frame error rate of the base station (example 2) in the transmission power control.
Figure 8B:
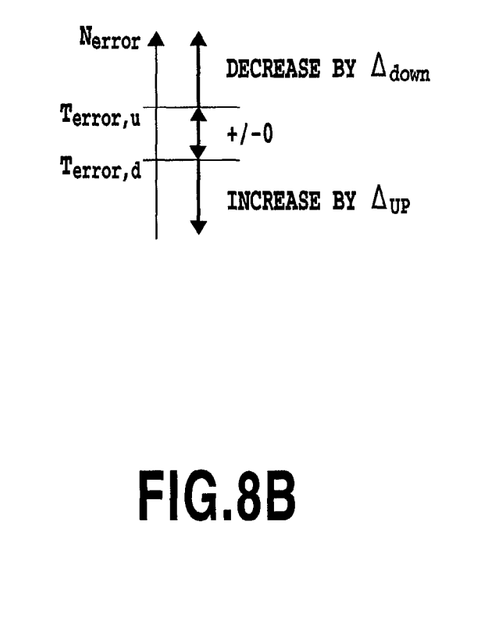
Figure 9A:
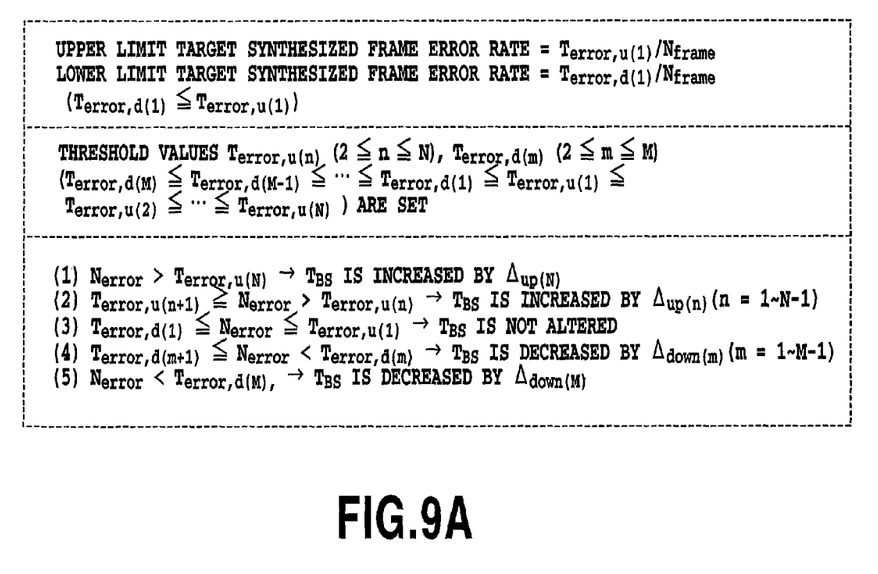
FIGS. 9A and 9B are explanatory diagrams showing an example for correcting the target frame error rate of the base station (example 3) in the transmission power control.
Figure 9B:
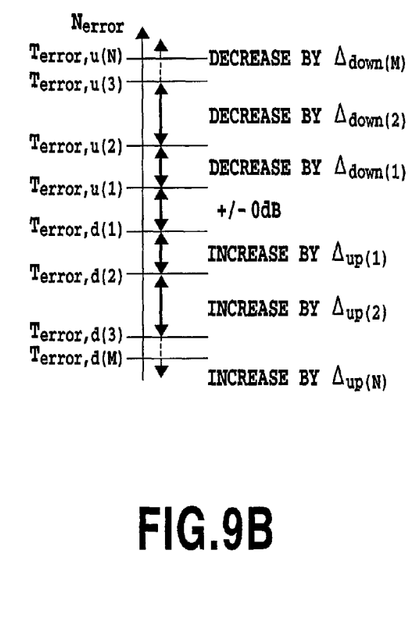

FIGS. 7A to 7C show the example 1. $T_{BS}$ represents the total of threshold values of the frame error rates shown in FIGS. 2A to 2C to 4A and 4B. As explained in FIGS. 2A to 2C to 4A and 4B, the number of frame errors $N_{error}$ among the number of measurement frames $N_{frame}$ of frame error rate after being synthesized for site diversity is measured, and this measured value is compared with the predetermined threshold value.

In the example 1, comparing $N_{error}$ with $T_{error}$, where
1) measured synthesized frame error rate≧target synthesized frame error rate,
   i.e., $N_{error} \geq T_{error}$:
   →threshold value $T_{BS}$ of the frame error rate at each base station is decreased by $\Delta_{down}$;
2) measured synthesized frame error rate<target synthesized frame error rate,
   i.e., $N_{error} < T_{error}$:
   →the threshold value $T_{BS}$ of the frame error rate of each base station is increased by $\Delta_{up}$.

More particularly, when the measured synthesized frame error rate is worse (larger) than the target synthesized frame error rate, the threshold value $T_{BS}$ of the frame error rate at each base station is decreased, thereby reducing the target frame error rate at each base station and then improving of the reception quality.

Further, on the contrary, the measured synthesized frame error rate is better (smaller) than the target synthesized frame error rate, the threshold value $T_{BS}$ of the frame error rate at each base station is increased, thereby increasing the target frame error rate at each base station and then degrading the reception quality.

Example 2

The example 2 may be similar to the example 2 (FIGS. 3A and 3B) of the first embodiment.

Example 3

The example 3 may also be similar to the example 3 (FIGS. 4A and 4B) of the first embodiment.

Above mentioned examples, each threshold value and the number of measured frames are the same symbols for control at each base station, but these values may be set independently from others. Further, concerning the step size Δ~, the different value may be used every the $T_{BS}$ at each base station.

It is possible that target reception power (S) can be applicable as reception power instead of the target reception SIR value.

Further, the bit error rate can be applicable as the reception error rate instead of the frame error rate.

In measuring the bit error rate, the method, in which the signal whose transmission pattern is known at the receiver, e.g., the pilot signal for synchronous detection can be used. Samely, in the case of encoding the error correction, the method in which the result of decoding on the side of the receiver of the error correction code is encoded again and this encoded value is used as a reference signal, thereby enabling the error rate of the reception demodulation series (before decoding for error correction) to be measured, can be used.

Further, in the transmission power control method according to the present invention, the same effect can be obtained even if the down-link is used instead of the up-link.

As described above, according to the present invention, in a system for transmitting a signal by using a broad-band spread transmission system, a receiver is featured in that the reception error rate of a received signal is detected; the detected reception error rate is compared with a predetermined target reception error rate; the SIR (the ratio between the target received signal power and the interference power) or the target reception power is corrected based on the result of the comparison; a transmission control signal (TPC control bit) is set so that the transmission power is controlled to a predetermined target value, based on the SIR or the target reception power value; whereby, for example, in the case of a cellular communication by using a DS-CDMA transmission system, a high-accuracy transmission power control system can be provided in that a constant reception quality (communication quality) can be assured regardless of the change in the propagation environment such as the number of multipath and the velocity of mobile station, and further regardless of the change in transmission and reception condition such as the presence or absence of site diversity reception, thereby enabling each communicator (mobile station) to communicate with others with a minimum necessary transmission power for obtaining a predetermined reception error rate depending on the given propagation environment and thus enabling the subscription capacity to be increased further.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A transmission power control method for controlling transmission power by performing site diversity reception for synthesizing received spectrum spread signals of mobile stations at a higher hierarchy station after receiving spectrum spread signals having a transmission power control bit at a plurality of base stations, the method comprising:
    demodulating, in the higher hierarchy station, a received spectrum spread signal of a predetermined mobile station, and generating a synthesized signal by synthesizing the demodulated signal by the site diversity reception;
    measuring a synthesized reception error rate of the generated synthesized signal;
    comparing the measured synthesized reception error rate with a predetermined set target synthesized reception error rate;
    correcting the predetermined set target reception error rate according to the predetermined mobile station set at a base station based on the result of the error rate comparison;
    receiving, in the base station, the spectrum spread signal transmitted from the predetermined mobile station and measuring a ratio between a received signal power and an interference power value, or a reception power value;
    demodulating, in the base station, the received spectrum spread signal and measuring a reception error rate of the demodulated signal;
    comparing the measured reception error rate with the corrected target reception error rate of the predetermined mobile station corrected by the higher hierarchy station;
    correcting a ratio between a predetermined target received signal power value and the interference power value, or a predetermined target reception power value based on the result of the error rate comparison;
    comparing the measured ratio between the received signal power value and the interference power value, or a reception power value with the corrected ratio between the target received signal power value and the interference power value, or the target reception power value;
    determining the transmission power control bit for controlling the transmission power of the base station based on the result of the power comparison, and transmitting the spectrum spread signal having the determined transmission power control bit from the base station to the predetermined mobile station; and
    varying, in the mobile station, the transmission power based on the determined transmission power control bit of the received spectrum spread signal.

2. The transmission power control method of claim 1, wherein, in the step of correcting the ratio, the corrected target reception error rate of the predetermined mobile station corrected by the higher hierarchy station is structured by a predetermined upper limit target reception error rate and a predetermined lower limit target reception error rate, and
    wherein the ratio between the target received signal power value and the interference power value, or the target reception power value is not altered when the measured reception error rate is between the upper limit target reception error rate and the lower limit target reception error rate, and
    wherein the ratio between the target received signal power value and the interference power value, or the target reception power value is altered when the measured reception error rate is not between the upper limit target reception error rate and the lower limit target reception error rate.

3. A transmission power control system for controlling transmission power by performing site diversity reception for synthesizing received spectrum spread signals of mobile stations at a higher hierarchy station after receiving spectrum spread signals having a transmission power control bit at a plurality of base stations, the system comprising:
    means for demodulating, in the higher hierarchy station, a received spectrum spread signal of a predetermined mobile station, and generating a synthesized signal by synthesizing the demodulated signal by the site diversity reception;
    means for measuring a synthesized reception error rate of the generated synthesized signal;
    means for comparing the measured synthesized reception error rate with a predetermined set target synthesized reception error rate;
    means for correcting the predetermined set target reception error rate according to the predetermined mobile station set at a base station based on the result of the error rate comparison;
    means for receiving, in the base station, the spectrum spread signal transmitted from the predetermined mobile station and measuring a ratio between a received signal power and an interference power value, or a reception power value;
    means for demodulating, in the base station, the received spectrum spread signal and measuring a reception error rate of the demodulated signal;
    means for comparing the measured reception error rate with the corrected target reception error rate of the predetermined mobile station corrected by the higher hierarchy station;
    means for correcting a ratio between a predetermined target received signal power value and the interference power value, or a predetermined target reception power value based on the result of the error rate comparison;
    means for comparing the measured ratio between the received signal power value and the interference power value, or a reception power value with the corrected ratio between the target received signal power value and the interference power value, or the target reception power value;
    means for determining the transmission power control bit for controlling the transmission power of the base station based on the result of the power comparison, and transmitting the spectrum spread signal having the determined transmission power control bit from the base station to the predetermined mobile station; and means for varying, in the mobile station, the transmission power based on the determined transmission power control bit of the received spectrum spread signal.

4. The transmission power control method of claim 3, wherein, in the means of correcting the ratio, the corrected target reception error rate of the predetermined mobile station corrected by the higher hierarchy station is structured by a predetermined upper limit target reception error rate and a predetermined lower limit target reception error rate, and wherein the ratio between the target received signal power value and the interference power value, or the target reception power value is not altered when the measured reception error rate is between the upper limit target reception error rate and the lower limit target reception error rate, and wherein the ratio between the target received signal power value and the interference power value, or the target reception power value is altered when the measured reception error rate is not between the upper limit target reception error rate and the lower limit target reception error rate.

* * * * *

UNITED STATES PATENT AND TRADEMARK OFFICE
CERTIFICATE OF CORRECTION

PATENT NO. : 6,967,987 B2  Page 1 of 2
APPLICATION NO. : 09/894661
DATED : November 22, 2005
INVENTOR(S) : Higuchi et al.

It is certified that error appears in the above-identified patent and that said Letters Patent is hereby corrected as shown below:

Column 1,
Lines 25-26, after "can communicate" insert --with--
Line 28, after "necessary" insert --that--
Line 29, after "input signal" remove "must"
Line 42, after "characterized by" remove "that"
Line 43, after "base station" change "vary" to --varies--
Line 46, after "interferes will" remove "a"
Line 53, before "each mobile" remove "the"

Column 2,
Line 6, change "previous" to --previously--
Line 21, before "actual propagation path," insert --an--
Line 24, after "rake diversity" remove "effect"
Line 27, after "time variations" insert --,--
Line 27, change "multipath" to --multipaths--
Line 57, after "environment" insert --,--
Line 58, change "multipath," to --multipaths,--

Column 3,
Line 53, change "make" to --makes--
Line 58, change "signal" to --signals--

Column 4,
Line 38, after "the composition" insert --of--
Line 43, change "(signal" to --(signals--
Lines 57-58, replace equation (1) with the following equation:
    --Frame Error Rate=(number of Error Frames)/(Total Number of Frames)--
Line 59, change "frame 10" to --frames 10--
Line 61, change "error frame," to --error frames,--

Column 5,
Line 10, replace equation (2) with the following equation:
    --Bit Rate Error=(Number of Bit Errors)/(Total Number of Bits)--
Line 25, before "error correction" insert --an--
Line 29, change "bit occurs." to --bit errors occur.--
Line 56, change "well know" to --well known--

UNITED STATES PATENT AND TRADEMARK OFFICE
CERTIFICATE OF CORRECTION

PATENT NO. : 6,967,987 B2 Page 2 of 2
APPLICATION NO. : 09/894661
DATED : November 22, 2005
INVENTOR(S) : Higuchi et al.

It is certified that error appears in the above-identified patent and that said Letters Patent is hereby corrected as shown below:

Column 6,
Line 20, before "base station," insert --the--
Line 32, change "error of the frame is free." to --frame is free of errors.--
Line 35, before "$N_{frames}$" change "frame," to --frames,--
Line 35, change "number of frame," to --number of frames,--
Line 41, after "rate" remove "is compared"
Line 46, change "0.1 second-several seconds," to --0.1 seconds to several seconds,-- \

Column 7,
Line 16, change "multipath," to --multipaths,--

Column 8,
Lines 16-17, change "thereby decreasing" to --this thereby decreases--
Line 63, change "variable" to --vary--

Column 10,
Line 25, change "Above" to --As in the above--
Line 29, before "different value" change "the" to --a--
Line 29, change "every the" to --for every--
Line 36, after "the method" remove ","
Line 38, after "pilot signal" insert --,--
Line 66, change ''multipath" to --multipaths--

Signed and Sealed this

Nineteenth Day of December, 2006

JON W. DUDAS
*Director of the United States Patent and Trademark Office*